United States Patent
Wang et al.

(10) Patent No.: US 7,507,495 B2
(45) Date of Patent: Mar. 24, 2009

(54) HYDROGEN ABSORPTION INDUCED METAL DEPOSITION ON PALLADIUM AND PALLADIUM-ALLOY PARTICLES

(75) Inventors: Jia X. Wang, East Setauket, NY (US); Radoslav R. Adzic, East Setauket, NY (US)

(73) Assignee: Brookhaven Science Associates, LLC, Upton, NY (US)

( * ) Notice: Subject to any disclaimer, the term of this patent is extended or adjusted under 35 U.S.C. 154(b) by 812 days.

(21) Appl. No.: 11/019,734

(22) Filed: Dec. 22, 2004

(65) Prior Publication Data

US 2006/0134505 A1 Jun. 22, 2006

(51) Int. Cl.
*H01M 4/90* (2006.01)
*B05D 5/12* (2006.01)

(52) U.S. Cl. .................. 429/44; 427/115; 427/216; 427/217

(58) Field of Classification Search .................. 429/19, 429/40, 42, 44; 427/115, 216, 217
See application file for complete search history.

(56) References Cited

U.S. PATENT DOCUMENTS

| | | | |
|---|---|---|---|
| 6,447,285 B1 | 9/2002 | Bertolini et al. | |
| 6,497,970 B1 * | 12/2002 | Fronk | ....................... 429/19 X |
| 6,524,736 B1 * | 2/2003 | Sompalli et al. | ............... 429/42 |
| 6,589,312 B1 | 7/2003 | Snow et al. | |
| 6,660,381 B2 * | 12/2003 | Halas et al. | ............. 427/217 X |
| 6,670,301 B2 | 12/2003 | Adzic et al. | |
| 6,783,569 B2 | 8/2004 | Cheon et al. | |
| 2003/0079999 A1 | 5/2003 | Penner et al. | |
| 2004/0065171 A1 | 4/2004 | Hearley et al. | |
| 2006/0062902 A1 * | 3/2006 | Sager et al. | ............. 427/217 X |

OTHER PUBLICATIONS

Zhang et al., Platinum Monolayer Electrocatalysts for O2 Reduction: PT Monolayer on Pd(111) and on Carbon-Supported Pd Nanoparticles, J. Phys. Chem. B, vol. 108, No. 30, pp. 10955-10964 (web date Jun. 22, 2004).*
Brankovic, S. R., et al, *Electrochem. Solid State Lett.*. 4: A217-A220 (2001), no month.
Brankovic, S. R., et al, *J. Electroanal. Chem.*, 503: 99-104 (2001), no month.

* cited by examiner

*Primary Examiner*—Stephen J. Kalafut
(74) *Attorney, Agent, or Firm*—Lori-Anne Neiger

(57) ABSTRACT

The present invention relates to methods for producing metal-coated palladium or palladium-alloy particles. The method includes contacting hydrogen-absorbed palladium or palladium-alloy particles with one or more metal salts to produce a sub-monoatomic or monoatomic metal- or metal-alloy coating on the surface of the hydrogen-absorbed palladium or palladium-alloy particles. The invention also relates to methods for producing catalysts and methods for producing electrical energy using the metal-coated palladium or palladium-alloy particles of the present invention.

33 Claims, 1 Drawing Sheet

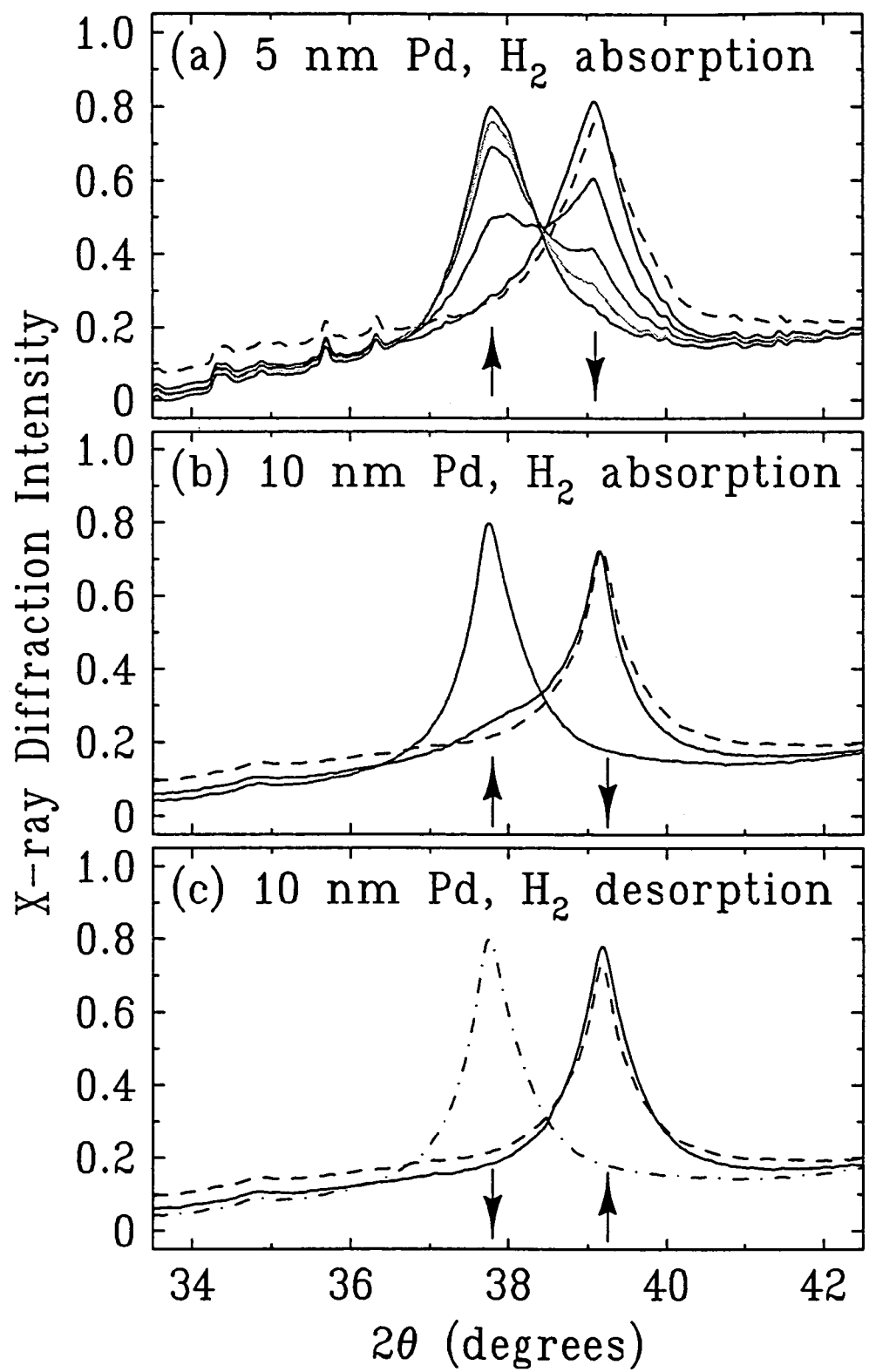
Figure 1 (a, b, c)

HYDROGEN ABSORPTION INDUCED METAL DEPOSITION ON PALLADIUM AND PALLADIUM-ALLOY PARTICLES

This invention was made with Government support under contract number DE-AC02-98CH10886, awarded by the U.S. Department of Energy. The Government has certain rights in the invention.

BACKGROUND OF THE INVENTION

The present invention relates to a method for producing metal-coated palladium or palladium-alloy particles useful as, for example, oxygen-reducing electrocatalysts in fuel cells. The invention particularly relates to methods for producing platinum surface monolayer nanoparticle composites having low platinum loading coupled with high catalytic activity.

A "fuel cell" is a device which converts chemical energy into electrical energy. In a typical fuel cell, a gaseous fuel such as hydrogen is fed to an anode (the negative electrode), while an oxidant such as oxygen is fed to the cathode (the positive electrode). Oxidation of the fuel at the anode causes a release of electrons from the fuel into an external circuit which connects the anode and cathode. In turn, the oxidant is reduced at the cathode using the electrons provided by the oxidized fuel. The electrical circuit is completed by the flow of ions through an electrolyte that allows chemical interaction between the electrodes. The electrolyte is typically in the form of a proton-conducting polymer membrane that separates the anode and cathode compartments and which is also electrically insulating. A well-known example of such a proton-conducting membrane is NAFION®.

A fuel cell, although having components and characteristics similar to those of a typical battery, differs in several respects. A battery is an energy storage device whose available energy is determined by the amount of chemical reactant stored within the battery itself. The battery will cease to produce electrical energy when the stored chemical reactants are consumed. In contrast, the fuel cell is an energy conversion device that theoretically has the capability of producing electrical energy for as long as the fuel and oxidant are supplied to the electrodes.

In a typical proton-exchange membrane (PEM) fuel cell, hydrogen is supplied to the anode and oxygen is supplied to the cathode. Hydrogen is oxidized to form protons while releasing electrons into the external circuit. Oxygen is reduced at the cathode to form reduced oxygen species. Protons travel across the proton-conducting membrane to the cathode compartment to react with reduced oxygen species forming water. The reactions in a typical hydrogen/oxygen fuel cell are as follows:

Anode:

(1)

Cathode:

(2)

Net Reaction:

(3)

In many fuel cell systems, a hydrogen fuel is produced by converting a hydrocarbon-based fuel such as methane, or an oxygenated hydrocarbon fuel such as methanol, to hydrogen in a process known as "reforming". The reforming process typically involves the reaction of either methane or methanol with water along with the application of heat to produce hydrogen along with the byproducts of carbon dioxide and carbon monoxide.

Other fuel cells, known as "direct" or "non-reformed" fuel cells, oxidize fuel high in hydrogen content directly, without the hydrogen first being separated by a reforming process. For example, it has been known since the 1950's that lower primary alcohols, particularly methanol, can be oxidized directly. Accordingly, a substantial effort has gone into the development of the so-called "direct methanol oxidation" fuel cell because of the advantage of bypassing the reformation step.

In order for the oxidation and reduction reactions in a fuel cell to occur at useful rates and at desired potentials, electrocatalysts are required. Electrocatalysts are catalysts that promote the rates of electrochemical reactions, and thus, allow fuel cells to operate at lower overpotentials. Accordingly, in the absence of an electrocatalyst, a typical electrode reaction would occur, if at all, only at very high overpotentials. Due to the high catalytic nature of platinum, supported platinum and platinum alloy materials are preferred as electrocatalysts in the anodes and cathodes of fuel cells.

However, platinum is a prohibitively expensive precious metal. In fact, the required platinum loading using current state-of-the-art electrocatalysts is still too high for commercially viable mass production of fuel cells.

Accordingly, some research has focused on reducing the amount of costly platinum in fuel cell cathodes and anodes by combining the platinum with a lower cost metal. For example, U.S. Pat. No. 6,670,301 B2 to Adzic et al. relates to the deposition of ultrathin layers of platinum on ruthenium nanoparticles by a spontaneous process. The platinum-coated ruthenium nanoparticles are useful as carbon monoxide-tolerant anode electrocatalysts in fuel cells. Also see: Brankovic, S. R., et al, "Pt Submonolayers On Ru Nanoparticles—A Novel Low Pt Loading, High CO Tolerance Fuel Cell Electrocatalyst", *Electrochem. Solid State Lett.*, 4, p. A217 (2001); and Brankovic, S. R., et al, "Spontaneous Deposition Of Pt On The Ru(0001) Surface", *J. Electroanal. Chem.*, 503: 99 (2001), which also disclose platinum monolayers on ruthenium nanoparticles.

A method for depositing an atomic monolayer of platinum on palladium nanoparticles was recently reported. See J. Zhang, et al., "Platinum Monolayer Electrocatalysts For O₂ Reduction: Pt Monolayer On Pd(111) And On Carbon-Supported Pd Nanoparticles", *J. Phys. Chem. B.*, 108: 10955 (2004). The method disclosed in Zhang et al. involves first, the electrodeposition of an atomic monolayer of an underpotentially deposited metal such as copper onto palladium nanoparticles. The electrodeposition is followed by contact with a platinum salt solution to initiate a spontaneous redox displacement of the copper atomic monolayer by a platinum monolayer.

The platinum-coated palladium nanoparticles were reported by Zhang et al. to significantly reduce platinum loadings in fuel cell electrocatalysts. In addition, the platinum-coated palladium nanoparticles were reported by Zhang et al. to possess significantly higher catalytic activity for the reduction of oxygen than the corresponding platinum nanoparticles. The higher catalytic activity for the platinum-coated palladium nanoparticles is presumed to be a result of a synergistic effect of palladium on the platinum layer.

It is evident that the platinum-coated palladium nanoparticles hold great promise as a major advance for fuel cell electrocatalysts. In fact, palladium and palladium-alloy particles coated with numerous other metals besides platinum, including the main group and transition metals, are also expected to advance, inter alia, catalysts, electrocatalysts, and other materials.

The method for depositing platinum onto palladium nanoparticles described by Zhang et al. contains several practical limitations. For example, the method of Zhang et al. requires contact of the palladium nanoparticles with an electrode in order to electrodeposit copper onto the palladium nanoparticles. In addition, the method of Zhang et al. generates copper waste during platinum displacement of copper.

None of the art described above discloses a method for depositing a layer of a metal onto a palladium or palladium-alloy particle using a method that is convenient and practical, e.g., that does not require electrodeposition and does not generate waste. Nor does any of the art discussed above disclose a convenient and practical method for the deposition of an atomically thin layer of any of a large variety of metals onto palladium or palladium-alloy particles.

Thus, a convenient and practical method for depositing a layer, particularly an atomically thin layer, of any of a large variety of metals onto palladium and palladium-alloy particles is needed. The present invention relates to such methods.

SUMMARY OF THE INVENTION

The present invention relates to methods for producing metal- and metal alloy-coated palladium or palladium-alloy particles. More particularly, the methods of the present invention relate to depositing sub-monoatomic and monoatomic layers of metals, particularly platinum, onto palladium and palladium-alloy particles or nanoparticles.

The method includes contacting hydrogen-absorbed palladium or palladium-alloy particles with one or more metal salts to produce a sub-monoatomic or monoatomic metal coating on the surface of said palladium or palladium-alloy particles.

In one embodiment, the metal-coated palladium or palladium-alloy particles are microparticles. Preferably, the microparticles have a size of from about 500 nanometers to about 10 microns.

In another embodiment, the metal-coated palladium or palladium-alloy particles are nanoparticles. The nanoparticles preferably have a size of from about 3 nanometers to about 500 nanometers. More preferably, the metal-coated palladium or palladium-alloy nanoparticles have a minimum size of about 3 nanometers and a maximum size of about 10 nanometers. The maximum size of the metal-coated nanoparticles is preferably no more than about 12 nanometers. The metal-coated palladium or palladium-alloy nanoparticles most preferably have a size of about 5 nanometers.

The metal in the sub-monoatomic or monoatomic metal coating may be any suitable metal, e.g., a main group, transition, lanthanide, or actinide metal. Preferably, the metal is a transition metal, most notably platinum.

The hydrogen-absorbed or metal-coated palladium or palladium-alloy particles may be unsupported, or alternatively, bound to a support. The support may be any suitable support. When applied as fuel cell electrocatalysts, the support is preferably electrically conductive. Some preferred electrically conductive supports include carbon black, graphitized carbon, graphite, or activated carbon.

One embodiment relates to metal-coated palladium particles. The metal-coated palladium particles contain a core composed of palladium coated with a shell of a metal.

Another embodiment relates to metal-coated palladium-alloy particles. The metal-coated palladium-alloy particles contain a core composed of palladium-alloy coated with a shell of a metal. Preferably, the alloying component in the palladium-alloy is a metal or combination of metals. More preferably, the alloying metal or metals are transition metals. Even more preferably, the alloying component is one or more 3d transition metals, i.e., the row of tranaltion metals starting with scandium (Sc). Even more preferably, the alloying component is nickel (Ni), cobalt (Co), iron (Fe), or any combination thereof. Gold (Au) and its combination with other metals, particularly, Ni, Co, and Fe, are other preferred alloying components.

In one embodiment, the palladium-alloy core in the metal-coated palladium-alloy particle is composed of a homogeneous palladium-metal alloy composition.

In another embodiment, the palladium-alloy core is composed of a heterogeneous palladium-alloy composition. An example of a palladium-alloy particle having a heterogeneous palladium-metal alloy composition is any non-palladium metal inner sub-core coated with an outer shell of palladium.

When appropriate, the metal-coated particles as thus far described may also have metal-bonding ligands or surfactants bound to, or associated with, the surface. The metal-coated particles may also be in the form of a suspension or dispersion in a liquid phase. The liquid phase may be any suitable liquid phase such as an organic solvent or an alcohol. Preferably, the liquid phase is aqueous-based. Some examples of suitable aqueous-based liquid phases include water and water-alcohol mixtures.

In a preferred embodiment, hydrogen-absorbed palladium or palladium-alloy particles are produced by exposing palladium or palladium-alloy substrate particles to hydrogen. In one embodiment, the palladium or palladium-alloy substrate particles and the metal salt or metal salt mixture are not in contact during the time the palladium or palladium-alloy substrate particles are exposed to hydrogen. In another embodiment, the palladium or palladium-alloy substrate particles and the metal salt or metal salt mixture are in contact during the time the palladium or palladium-alloy particles are exposed to hydrogen.

In a further embodiment of the above, the hydrogen-absorbed palladium or palladium-alloy particles and the metal salt or metal salt mixture are further exposed to hydrogen after the metal salt contacts the hydrogen-absorbed palladium or palladium-alloy particles.

Preferably, in any of the embodiments above, the palladium or palladium-alloy substrate particles are exposed to hydrogen for a period of time sufficient to bring x in $PdH_x$ to a value of approximately 0.6, as determined by x-ray diffraction.

The invention additionally relates to methods for producing electrical energy. The method includes firstly, contacting an oxygen-reducing cathode of a fuel cell with oxygen. The oxygen-reducing cathode contains metal-coated particles of the present invention, produced as described above, and bound to an electrically conductive support.

The method for producing electrical energy includes secondly, contacting an anode of the fuel cell with a fuel source.

The oxygen-reducing cathode is in electrical contact with the anode and the oxygen-reducing cathode and the anode are in chemical contact through mutual contact with an ion-transporting medium. Preferably, the ion-transporting medium is a proton-conducting medium.

Some examples of fuel sources include, for example, hydrogen gas, methanol, methanol reformate, methane, methane reformate, gasoline, gasoline reformate, formic acid, and ethylene glycol.

As a result of the present invention, a convenient and practical method for depositing a layer, particularly an atomically thin layer, of any of a large variety of metals onto palladium and palladium-alloy particles or nanoparticles is made possible.

BRIEF DESCRIPTION OF THE FIGURES

FIG. 1(a, b, c). X-ray diffraction intensity profiles (solid lines) for palladium particles as a function of time of exposure to 5% hydrogen in helium (1a and 1b) and after the removal of hydrogen (1c). The dashed line is the original curve obtained in the absence of hydrogen. The dot-dash line in (1c) is the curve obtained before hydrogen gas pressure was reduced.

DETAILED DESCRIPTION OF THE INVENTION

In one embodiment, the invention relates to a method for producing metal-coated palladium or palladium-alloy particles. In a preferred embodiment, the metal coating is atomically thin.

The "atomically thin surface layer" is a layer of zerovalent metal atoms of sub-monoatomic, monoatomic, diatomic, or triatomic thickness, or any combination thereof. A layer of monoatomic thickness of metal atoms, i.e., an atomic monolayer, is a single layer of close-packed metal atoms on the palladium or palladium-alloy particle surface. An atomic monolayer has a surface packing parameter of 1.

A layer of sub-monoatomic thickness, i.e., an atomic submonolayer, is a layer of zerovalent metal atoms which is less dense than an atomic monolayer (i.e., not close-packed). Accordingly, an atomic submonolayer has a surface packing parameter of less than 1. For example, a surface packing parameter of 0.5 indicates half the density of metal atoms in a metal atom monolayer.

A layer of diatomic thickness refers to a bilayer (two-atom thick) of zerovalent metal atoms. A layer of triatomic thickness refers to a trilayer (three-atom thick) of zerovalent metal atoms.

In a preferred embodiment, the atomically thin layer of metal atoms covers the entire surface of the palladium or palladium-alloy particle. In another embodiment, the atomically thin layer of metal atoms covers a portion of the palladium or palladium-alloy particle. For example, the atomically thin layer of metal surface atoms may be characterized as interconnected islands with some regions of monoatomic, diatomic, or triatomic depth.

The metal coating on the surface of the palladium or palladium-alloy particle includes one or more metals other than alkali or alkaline earth metal. For example, the metal coating may be one or more metals selected from the main group, transition, lanthanide, or actinide classes of metals. When two or more metals are combined in the coating, the metal coating may be a binary, ternary, or quaternary alloy or composite.

When the method of the present invention is applied to catalysts, the metal coating is preferably any suitable transition metal or transition metal alloy. When the method of the present invention is applied to fuel cells, the metal coating is preferably an active metal for use in fuel cell catalysts, most notably platinum. More preferably, the platinum is an atomic monolayer or submonolayer of platinum.

In one embodiment, an atomic submonolayer of platinum contains only platinum in the absence of other co-deposited metal atoms. In another embodiment, an atomic submonolayer of platinum atoms includes one or more co-deposited atomic submonolayers of another metal to form a platinum-metal alloy monolayer. The co-deposited metal(s) in the platinum-metal alloy monolayer may be, for example, a main group, transition, lanthanide, or actinide metal. The co-deposited metal(s) in a platinum-metal alloy monolayer provide such advantages as, for example, further reduction in platinum loading as compared to a pure platinum monolayer, reduction in catalytic poisoning, and/or enhancement of catalytic activity.

The ratio of co-deposited metal to platinum in the platinum-metal alloy monolayer is not particularly limited. For example, the platinum-metal alloy monolayer may be a binary alloy according to the formula $M_xPt_{1-x}$, where M is any of the metals described above, and x is anywhere from approximately 0.01 to 0.99.

The platinum-metal alloy monolayer may additionally be a ternary, quaternary, or higher alloy. For example, the platinum-metal alloy monolayer may be a ternary or quaternary alloy according to the formulas $M_xN_yPt_{1-x-y}$ or $M_xN_yT_zPt_{1-x-y-z}$, respectively, where M, N, and T are independently any of the metals described above, and the sum of x, y, and z is anywhere from approximately 0.01 to 0.99.

The metal-coated palladium and palladium-alloy particles can have any of several morphologies. For example, the particles can be approximately spherical, cubooctahedral, rod-shaped, cuboidal, pyramidal, amorphous, and so on.

The metal-coated palladium and palladium-alloy particles can also be in any of several arrangements. The particles may be, for example, agglomerates, micelles, ordered arrays, as a guest in a host such as a zeolite or patterned polymer, and so on.

The size of the metal-coated palladium and palladium-alloy particles is dependent upon the application, and is thus, not particularly limited. For example, in one embodiment, the size of the particles are a few nanometers to several hundred nanometers, i.e., nanoparticles. In another embodiment, the size of the particles range from hundreds of nanometers to tens or hundreds of microns, i.e., microparticles. In yet another embodiment, the size of the particles range from hundreds of microns to several millimeters in size.

When the metal-coated particles are applied as heterogeneous catalysts, the size of the particles may be anywhere from a few nanometers to several millimeters in size. For example, as catalysts, the minimum size of the particles is preferably 1 micron, more preferably 500 nanometers, more preferably 100 nanometers, and even more preferably 10 nanometers. The maximum size of the particles is preferably 1 millimeter, more preferably 500 microns, more preferably 100 microns, and even more preferably 10 microns.

When the metal-coated particles of the invention are directed as oxygen reduction electrocatalysts, as in fuel cells, the metal-coated particles are preferably nanoparticles. For fuel cells, the size of the particles is critical. As the size of the particles decrease, the particles tend to become increasingly susceptible to oxidation. On the other hand, as the size of the particles increase, the surface area of the particles decrease. The decrease in surface area causes a concomitant decrease in catalytic activity and efficiency.

Therefore, when directed as fuel cell catalysts, the metal-coated nanoparticles preferably have a minimum size of about 3 nanometers. More preferably, the metal-coated nanoparticles have a minimum size of about 5 nanometers. The metal-coated nanoparticles preferably have a maximum size of about 500 nanometers, more preferably a maximum size of 100 nanometers, even more preferably a maximum size of about 50 nanometers, and most preferably a maximum size of about 10 nanometers.

Accordingly, in one embodiment, the metal-coated palladium or palladium-alloy nanoparticles have a minimum size of about 3 nanometers and a maximum size of about 10 nanometers. The maximum size of the metal-coated palladium or palladium-alloy nanoparticles is preferably no more than about 12 nanometers. The metal-coated nanoparticles most preferably have a size of about 5 nanometers.

One embodiment relates to metal-coated palladium particles. The metal-coated palladium particles contain a core composed of palladium atoms in the zerovalent oxidation state. The palladium core is derived from hydrogen-absorbed palladium particles. Thus, the core may also include hydrogen or hydride atoms. The palladium core is coated with a shell of a metal.

Another embodiment relates to metal-coated palladium-alloy particles. The metal-coated palladium-alloy particles contain a core composed of palladium-alloy. The palladium-alloy core is derived from hydrogen-absorbed palladium-alloy particles, and thus, may also include hydrogen or hydride atoms. The palladium-alloy core is composed of zerovalent palladium and an alloying component. The palladium-alloy core is coated with a shell of a metal.

The alloying component in the palladium-alloy core may be any chemical or chemicals capable of combining with palladium and that does not include palladium. For example, the alloying component may be carbon, silicon, silicon oxide, alumina, a metal, a polymer or polymer end-product, a dendrimer, a natural-based product such as cellulose, and so on.

Preferably, the alloying component in the palladium-alloy core is a metal or combination of metals not including palladium. For example, the metal in the palladium-metal alloy may be an alkali, alkaline earth, main group, transition, lanthanide, or actinide metal.

More preferably, the alloying metal or metals in the palladium-alloy core are transition metals. Even more preferably, the alloying component is one or more 3d transition metals, particularly nickel (Ni), cobalt (Co), and/or iron (Fe). Gold (Au) and its combination with other metals, particularly, Ni, Co, and Fe, are other preferred alloying components.

The palladium-alloy core in the metal-coated palladium-alloy particles can be in a homogeneous form. A homogeneous palladium-alloy composition is a form in which the palladium and the alloying component(s) are distributed uniformly throughout the core. Some examples of homogeneous palladium-alloy compositions include 50:50 Pd—Ni, 80:20 Pd—Ni, 40:60 Pd—Ni, 60:40 Pd—Co, 30:70 Pd—Co, 70:30 Pd—Fe, 60:20:20 Pd—Ni—Co, 40:40:20 Pd—Ni—Fe, 90:5:5 Pd—Fe—Co, 60:20:10:10 Pd—Ni—Co—Fe, 50:50 Pd—Au, and 80:20 Pd—Au compositions.

Alternatively, the palladium-alloy core is in a heterogeneous form. A heterogeneous palladium-alloy composition is a form in which the palladium and the alloying component(s) are distributed with varying composition, i.e., non-uniformly, in the palladium-alloy core. In such cases, there is a palladium component on the surface of the palladium-alloy core.

For example, a heterogeneous palladium-alloy core may have individual palladium grains intermingled with individual cobalt or carbon grains throughout the core; or alternatively, for example, a carbon, cobalt, nickel, iron, copper, ruthenium, gold, or silver sub-core surrounded by a palladium shell. Some other examples of heterogeneous palladium-alloy compositions include a palladium shell on a sub-core of silicon, silicon oxide, silicon nitride, titanium oxide, aluminum oxide, iron oxide, metal salt, latex, carbon, and so on.

In addition, a palladium-alloy core can have a combination of a homogeneous component and a heterogeneous component. An example of such a palladium-alloy core is one that contains a homogeneous sub-core of palladium metal-alloy coated with a shell of palladium metal. Another example of such a palladium-alloy core is one that contains a homogeneous phase of a palladium-metal alloy in combination with one or more interlayers of palladium.

The method of the present invention requires contacting hydrogen-absorbed palladium or palladium-alloy particles with a suitable metal salt or combination of suitable metal salts to deposit a metal coating of zerovalent metal atoms. When a single metal salt is used, a metal coating containing the corresponding metal of the metal salt is deposited on the surface of the hydrogen-absorbed palladium or palladium-alloy particles.

Essentially any metal salt containing a suitable metal, as described above, may be used to deposit a metal coating. The metal salts may be, for example, a halide, nitrate, sulfate, carboxylate, amine, acetylacetonate, oxalate, hydroxide, cyanide, or combination thereof, of any suitable metal. When the invention is applied to fuel cells, the metal salt preferably does not contain halide or an organic component.

Some examples of suitable metal salts useful for depositing a corresponding metal layer include platinum (II) acetylacetonate, platinum (II) diamino dinitrite, platinum (IV) chloride, platinum (II) hexahydroxyplatinate, rhodium (III) acetate, rhodium (III) nitrate, iron (III) nitrate, iron (III) acetylacetonate, iron (II) sulfate, cobalt (II) acetate, cobalt (II) nitrate, nickel (II) sulfate, nickel (II) nitrate, copper (I) cyanide, copper (II) chloride, copper (II) acetate, zinc sulfate, zinc oxalate, tetrachloroauric acid, gold (I) cyanide, gold (III) chloride, gallium (III) nitrate, osmium (III) chloride, and rhenium (III) chloride.

For example, in one embodiment, the hydrogen-absorbed palladium or palladium-alloy particles are exposed to a solution containing the rhodium salt $RhCl_3$, or the iridium salt $IrCl_3$, or the ruthenium salt $RuCl_3$, in order to deposit an atomically thin layer of Rh, Ir, or Ru, respectively, on the surface of the palladium or palladium-alloy particles.

In a preferred embodiment, the hydrogen-absorbed palladium or palladium-alloy particles are exposed to a solution containing the platinum salt $K_2Pt(NO_2)_4$ in order to deposit an atomic monolayer or submonolayer of platinum on the palladium or palladium-alloy particles.

A combination or mixture of two or more metal salts may be used to deposit a metal alloy coating on the surface of the hydrogen-absorbed palladium or palladium-alloy particles. The metal atoms in the metal alloy coating correspond to the metal atoms in the combination of metal salts. The stoichiometric composition of the metal alloy is determined by the molar ratio of metals used in the combination of metal salts.

For example, a mixture of 50% palladium (II) trifluoroacetate and 50% tetraammineplatinum (II) hydroxide may be contacted with the hydrogen-absorbed palladium or palladium-alloy particles to deposit a binary alloy surface coating of $Pd_{0.5}Pt_{0.5}$. Similarly, a mixture of 50% ruthenium (III) chloride and 50% tetraammineplatinum (II) hydroxide may be contacted with the hydrogen-absorbed palladium or palladium-alloy particles to deposit a binary alloy surface coating of $Ru_{0.5}Pt_{0.5}$. Similarly, a mixture of 25% nickel (II) nitrate, 25% iron (II) sulfate, and 50% potassium tetranitroplatinate (II) may be contacted with the hydrogen-absorbed palladium or palladium-alloy particles to deposit a ternary alloy coating of $Ni_{0.25}Fe_{0.25}Pt_{0.5}$.

The metal salt or metal salt mixture is contacted with the hydrogen-absorbed palladium or palladium-alloy particles in any suitable manner. Preferably, the metal salt or metal salt mixture is in a liquid phase into which the hydrogen-absorbed particles are immersed. The liquid phase may be any suitable liquid phase as described above. For example, the metal salt may be dissolved in water to form an aqueous solution.

Alternatively, the metal salt is in the form of a metal ion-containing vapor or plasma. On contacting the hydrogen-absorbed palladium or palladium-alloy particles, the vaporous metal ions are reductively deposited onto the surface of the palladium or palladium-alloy particles.

The hydrogen-absorbed palladium and palladium-alloy particles are produced by any suitable method. In a preferred embodiment, hydrogen-absorbed palladium and palladium-alloy particles are produced by exposing palladium and palladium-alloy substrate particles to hydrogen. When the palladium or palladium-alloy substrate particles are exposed to hydrogen, they absorb hydrogen in a dissociative process.

The palladium or palladium-alloy substrate particles may be exposed to hydrogen by any suitable method. For example, in one embodiment, the palladium or palladium-alloy substrate particles are in a solid form, optionally on a support, when directly exposed to a stream of hydrogen gas. In another embodiment, the palladium or palladium-alloy substrate particles are suspended in a liquid phase into which hydrogen gas is bubbled.

The hydrogen source may be pure hydrogen, or alternatively, a mixture of hydrogen and another gas. For example, the hydrogen source may be a mixture of hydrogen and argon or a mixture of hydrogen and nitrogen. In addition, the hydrogen source used need not be of the highest purity, as long as any such impurities do not obviate the functioning of the resultant metal-coated particle.

In particular, oxygen has been found to be an undesirable species in the hydrogen source since oxygen is readily reduced by the resulting hydrogen-absorbed palladium particles. Accordingly, it is preferable that the hydrogen source contains essentially no oxygen. The vessel containing the palladium or palladium-alloy substrate may be flushed with an oxygen-free hydrogen source or other oxygen-free gas to remove such traces of oxygen.

Preferably, the palladium or palladium-alloy substrate particles are exposed to hydrogen at standard temperature and pressure. However, the temperature and pressure as well as other parameters may be altered as found necessary or desirable. For example, the pressure may be increased in order to accelerate hydrogen absorption, while the temperature may be lowered to preserve hydrogen retention. Alternatively, the pressure may be decreased or the temperature increased to promote hydrogen release from the substrate particles. The latter acceleration of hydrogen release may in turn be utilized to accelerate deposition of the metal coating.

The palladium and palladium-alloy substrate particles are exposed to hydrogen for any suitable amount of time. For example, the substrate particles may be exposed for a few minutes under conditions where the partial pressure of hydrogen has been increased. On the contrary, the substrate particles may be exposed to hydrogen for a period of hours or perhaps days to ensure that a certain amount of hydrogen has been absorbed.

The absorption of hydrogen by palladium and palladium-alloy substrate particles has been shown by x-ray diffraction to pass through three crystallographic regions as the fraction of hydrogen, x, increases in $PdH_x$. The α-phase corresponds to $0 \leq x \leq 0.03$, a mixture of α and β phases corresponds to $0.3 \leq x \leq 0.58$, and the β-phase corresponds to $x \geq 0.58$. The limiting value of x for palladium has been shown to be approximately 0.76 under 100 kPa of hydrogen in the gas/solid environment. Accordingly, in a preferred embodiment, the substrate particles are exposed to hydrogen for a period of time sufficient to bring x to a high value, for example, when x reaches approximately 0.6.

The palladium and palladium-alloy substrate particles can be synthesized by various means. Some methods known in the art for synthesizing such particles include reductive chemical methods in a liquid phase, chemical vapor deposition (CVD), thermal decomposition, physical vapor deposition (PVD), reactive sputtering, electrodeposition, laser pyrolysis, and sol gel techniques.

The palladium and palladium-alloy substrate particles form the core of the metal-coated palladium and palladium-alloy particles. Accordingly, the above discussion concerning the requirements of the palladium and palladium-alloy cores applies to the palladium and palladium-alloy substrate particles as well.

In one embodiment, the palladium or palladium-alloy substrate particles are exposed to hydrogen in the presence of the metal salt or metal salt mixture. For example, in one embodiment, the palladium or palladium-alloy substrate particles are within a solution of a metal salt or metal salt mixture during exposure to hydrogen. The substrate particles may be in the form of a suspension in the metal salt solution, or alternatively, in the form of a supported solid immersed in the metal salt solution. As the substrate particles absorb hydrogen, the corresponding metal coating forms on the substrate particles.

When the substrate particles and metal salt are in contact during hydrogen exposure, as described in the embodiment above, the hydrogen does not directly reduce the metal ions in the metal salt. The metal salt is reduced indirectly through the formation of palladium hydride. The conditions used during hydrogen exposure are sufficiently mild so as to preclude the direct reduction of the metal salt by hydrogen.

In another embodiment, the palladium or palladium-alloy substrate particles are exposed to hydrogen in the absence of the metal salt or metal salt mixture. For example, in one embodiment, the palladium or palladium-alloy substrate particles are first separately exposed to hydrogen before being placed within a solution containing a metal salt or metal salt mixture. The hydrogen-absorbed substrate particles, which are either suspended in solution or in a solid phase, are subsequently immersed, suspended, or mixed into a solution containing the metal salt or metal salt mixture to deposit the corresponding metal or metal alloy, respectively.

In yet another embodiment, the two embodiments described above are combined. For example, in a preferred embodiment, the palladium or palladium-alloy substrate particles are first separately exposed to hydrogen before being placed within a solution containing a metal salt or metal salt mixture. The hydrogen-absorbed substrate particles, which are either suspended in solution or in a solid phase, are subsequently immersed, suspended, or mixed into a solution containing the metal salt or metal salt mixture to deposit the corresponding metal or metal alloy, respectively. Subsequently, the hydrogen-absorbed substrate particles and metal salt combination is exposed to additional hydrogen. The foregoing embodiment is particularly useful when using small substrate nanoparticles (for example, 3-5 nm size) since such nanoparticles have a high dispersion. The high dispersion of small nanoparticles tends to make complete hydrogen absorption more difficult. Therefore, the additional hydrogen exposure allows such small nanoparticles to more completely absorb hydrogen.

In addition, the initially produced metal coating on the palladium or palladium-alloy particles may function as a template for the deposition of additional metal. The additional metal may be the same metal or a different metal as the initially produced metal coating. The additional metal may be deposited by methods known in the art, e.g., electroless and electrolytic methods of deposition. Alternatively, the additional metal may be deposited by subjecting the initially produced metal-coated palladium particle to an additional procedure of hydrogen exposure using the methods of the present invention. The hydrogen-absorbed metal-coated palladium or palladium-alloy particle may thereby function to deposit additional metal.

For example, in one embodiment, a platinum- or gold-coated palladium particle is further coated with nickel or copper using electroless methods known in the art. In another embodiment, a nickel-coated palladium particle is heated to a few hundred degrees Celsius to enable nickel diffusion into the palladium particle. The nickel-palladium particle is then exposed to additional hydrogen and then contacted with a platinum salt to deposit a coating of platinum onto the nickel-palladium particles.

By the process described above for additional metal deposition, incremental and/or selective growth of palladium particles is possible. For example, palladium and palladium-alloy nanoparticles can be grown to a specific size by depositing additional palladium or palladium-alloy by using the procedure described above.

The hydrogen-absorbed palladium and palladium-alloy substrate particles and their metal-coated counterparts may be in any suitable form. For example, the particles may be in a solid form, e.g., a powder. The powder may be unsupported or alternatively, bound to a support.

The support may be any suitable support. For example, the support may be carbon, alumina, silica, silica-alumina, titania, zirconia, calcium carbonate, barium sulphate, a zeolite, interstitial clay, and so on.

In some cases, the support is required to be electrically conductive, e.g., when the metal-coated particle is to be used in a fuel cell. Some examples of electrically conductive supports include carbon black, graphitized carbon, graphite, and activated carbon. The electrically conductive support material is preferably finely divided.

The hydrogen-absorbed palladium and palladium-alloy particle substrates and their metal-coated counterparts may also be suspended or dispersed in a liquid phase. The liquid phase may be any suitable liquid phase. For example, the liquid phase may be aqueous-based. The aqueous-based liquid phase may be completely water or may alternatively include another suitable solvent. For example, the aqueous-based liquid phase may be a water-alcohol mixture.

The liquid phase may include an organic solvent. Some examples of suitable organic solvents include acetonitrile, dimethylsulfoxide, dimethylformamide, toluene, methylene chloride, chloroform, hexanes, glyme, diethyl ether, and the like.

The metal-coated palladium or palladium-alloy particles may have on their surface some trace chemicals. Some examples of trace chemicals include oxides, halogens, carbon monoxide, and so on, as long as such trace chemicals do not obviate the intended use of the particle. For example, for use in fuel cells, it is preferred that the palladium particle substrates do not contain surface oxides and carbon monoxide.

The metal-coated palladium or palladium-alloy particles may also include, when appropriate, any suitable metal-bonding ligands or surfactants bound to, or associated with, the surface of the particles. Some examples of metal-bonding ligands include phosphines, amines, and thiols. Some more specific examples of metal-bonding ligands include trialkylphosphines, triphenylphosphines and derivatives therefrom, diphosphines, pyridines, trialkylamines, diamines such as ethylenediaminetetraacetic acid (EDTA), thiophenol, alkylmercaptans, and alkyleneoxy, ethyleneoxy and poly(ethyleneoxy) derivatives therefrom, and so on. Some examples of surfactants include polyvinylalcohol, polyvinylpyrrolidinone, albumin, polyethyleneglycols, sodium dodecyl sulfate, fatty acid salts, and the like.

In another embodiment, the invention relates to a method for producing electrical energy. The method for producing electrical energy includes the combined use of elements typically used in a fuel cell for generating electrical energy, i.e., a fuel-oxidizing anode, an oxygen-reducing cathode, a proton-conducting medium, an oxygen source, and a fuel source. The oxygen-reducing cathode is in electrical contact with the anode, and both cathode and anode are in chemical contact through mutual contact with the proton-conducting medium. Electrical energy is produced when the cathode is in contact with oxygen gas and the anode is in contact with the fuel source. The oxygen-reducing cathode preferably contains platinum-coated palladium or palladium-alloy particle or nanoparticle composites produced according to the method described above.

Oxygen gas may be supplied to the oxygen-reducing cathode in any suitable form. For example, the oxygen gas may be supplied as pure oxygen gas. Alternatively, the oxygen gas is supplied as air. Alternatively, oxygen gas is supplied as a mixture of oxygen and one or more other inert gases. For example, oxygen may be supplied as oxygen-argon or oxygen-nitrogen mixtures.

Some contemplated fuel sources include, for example, hydrogen gas and alcohols. Some examples of suitable alcohols include methanol and ethanol. The alcohol may be unreformed or reformed. An example of a reformed alcohol is methanol reformate. Examples of other fuels include methane, gasoline, formic acid, and ethylene glycol. The gasoline or methane is preferably reformed to produce fuel more suitable for existing fuel cells.

The proton-conducting medium is a medium that conducts only protons and separates the fuel and oxygen gas. The proton-conducting medium may be in any of several suitable forms, for example, a liquid, solid, or semi-solid. A preferred proton-conducting membrane is the perfluorinated polymer NAFION®.

The anode may be any of the anodes known in the art. For example, the anode may be supported or unsupported platinum or platinum-alloys. The anode may also include a carbon monoxide-tolerant electrocatalyst. Such carbon monoxide-tolerant anodes include several platinum alloys. A notable carbon monoxide tolerant anode containing a monolayer or submonolayer of platinum on ruthenium nanoparticles has been disclosed by Adzic et al. (U.S. Pat. No. 6,670,301 B2). The foregoing patent by Adzic et al. is included herein by reference in its entirety.

Examples have been set forth below for the purpose of illustration and to describe the best mode of the invention at the present time. However, the scope of this invention is not to be in any way limited by the examples set forth herein.

EXAMPLE 1

Preparation of Platinum-Coated Palladium Nanoparticle Composites

Twenty nmoles of palladium nanoparticles on a carbon support (10.6 mg 20% wt Pd/C purchased from E-TEK) were placed in a glass container with a gas inlet and outlet. The glass container was flushed with argon gas to remove traces of oxygen. The container was then filled with hydrogen gas for a period of about one hour. Separately, a 1mM aqueous solution of $K_2Pt(NO_2)_4$ was prepared and deaerated. The resulting $K_2Pt(NO_2)_4$ solution was added into the container. The gas was then switched to pure argon. The suspension in the container was sonicated to ensure a uniform contact between the palladium nanoparticles and the solution. After about an hour, hydrogen gas was bubbled through the suspension for another hour to make sure all the platinum ions were completely deposited on the palladium nanoparticles. The activity for oxygen reduction was then measured by the rotating disk electrode method in 0.1 M $HClO_4$ solution. The catalytic activity of the platinum-coated nanoparticles was found to be the same as the catalytic activity of the platinum nanoparticles, even though the platinum-coated nanoparticles have a platinum loading only one-third of that of the platinum nanoparticles. In other words, the Pt mass specific activity of the Pt-coated Pd nanoparticles is three times of that for the commonly used Pt/C catalysts.

EXAMPLE 2

X-Ray Diffraction Analysis of Hydrogen-Absorbed and Desorbed Palladium Nanoparticles The x-ray diffraction intensity profiles for hydrogen absorption in 5 nm palladium particles is shown in FIG. 1a. The peak position (39.2°) in the rightmost set of peaks corresponds to the lattice spacing of palladium nanoparticles before hydrogen absorption. The successively smaller peaks in the rightmost set of peaks and the increase of the leftmost set of peaks correspond to the lattice expansion of palladium as a function of time of exposure to 5% hydrogen in helium, i.e., after 2, 4, 6, 8, and 10 minutes of exposure. The curve corresponding to 10 minutes of hydrogen exposure shows a single x-ray diffraction peak (in leftmost set of peaks) at 37.8°, indicating the formation of the β phase of palladium hydride is completed. The shift of peak position from 39.2 to 37.8 corresponds to a lattice expansion of 3.5%, which is consistent with the value expected for the maximum absorption of hydrogen by a palladium nanoparticle with x=0.6 in the $PdH_x$ formula.

The x-ray diffraction intensity profiles for hydrogen absorption in 10 nm palladium particles is shown in FIG. 1b. The conditions used for generating FIG. 1b were the same as those used in FIG. 1a, except for the use of 10 nm palladium nanoparticles instead of 5 nm palladium nanoparticles. In FIG. 1b, hydrogen exposure times of 2 and 4 minutes correspond to the two curves shown by the solid lines. While not much change can be seen from the 2 minute curve compared to the original curve (dashed line), the 4 minute curve exhibits the feature indicating the completion of hydrogen absorption. This time is significantly shorter than the 10 minutes for the 5 nm Pd nanoparticles.

FIG. 1c shows the x-ray diffraction intensity profiles for hydrogen desorption in the 10 nm hydrogen-absorbed palladium nanoparticles of FIG. 1b. The solid line in FIG. 1c corresponds to 2 minutes of the application of reduced pressure. As is evident from FIG. 1c, two minutes of reduced pressure was sufficient to completely desorb the hydrogen in the hydrogen-absorbed 10 nm palladium nanoparticles.

Thus, whereas there have been described what are presently believed to be the preferred embodiments of the present invention, those skilled in the art will realize that other and farther embodiments can be made without departing from the spirit of the invention, and it is intended to include all such further modifications and changes as come within the true scope of the claims set forth herein.

The invention claimed is:

1. A method for producing metal-coated palladium or palladium-alloy particles, the method comprising contacting hydrogen-absorbed palladium or palladium-alloy particles with a metal salt or metal salt mixture to deposit a sub-monoatomic or monoatomic metal coating or sub-monoatomic or monoatomic metal alloy coating on the surface of said hydrogen-absorbed palladium or palladium-alloy particles, thereby producing metal-coated or metal alloy-coated palladium or palladium-alloy particles.

2. A method according to claim 1, wherein said metal salt or metal salt mixture is dissolved in a liquid phase.

3. A method according to claim 2, wherein said metal salt or metal salt mixture is in the form of an aqueous solution of said metal salt or metal salt mixture.

4. A method according to claim 1, wherein said metal-coated palladium or palladium-alloy particles are metal-coated palladium or palladium-alloy nanoparticles.

5. A method according to claim 4, wherein said metal-coated palladium or palladium-alloy nanoparticles are from about 3 nanometers to about 500 nanometers in size.

6. A method according to claim 5, wherein said metal-coated palladium or palladium-alloy nanoparticles are from about 5 nanometers to about 10 nanometers in size.

7. A method according to claim 1, wherein said metal-coated palladium or palladium-alloy particles are metal-coated palladium or palladium-alloy microparticles.

8. A method according to claim 7, wherein said metal-coated palladium or palladium-alloy microparticles are from about 500 nanometers to about 10 microns in size.

9. A method according to claim 1, wherein a single metal salt is used to deposit a sub-monoatomic or monoatomic metal coating.

10. A method according to claim 9, wherein the metal in said metal salt and said sub-monoatomic or monoatomic metal coating is a transition metal.

11. A method according to claim 10 wherein the transition metal is platinum.

12. A method according to claim 1, wherein the palladium-alloy in said metal-coated palladium alloy particles is comprised of a homogeneous phase of palladium and one or more alloying metals.

13. A method according to claim 12, wherein said alloying metal is a transition metal.

14. A method according to claim 13, wherein the transition metal is chosen from the group consisting of nickel, cobalt, iron, gold, and a combination thereof.

15. A method according to claim 1, wherein the palladium-alloy in said metal-coated palladium alloy particles is comprised of a heterogeneous phase of palladium and one or more alloying metals, provided that some component of palladium in said palladium-alloy is bonded to the sub-monoatomic or monoatomic metal or metal alloy coating.

16. A method according to claim 15, wherein said heterogeneous phase is comprised of an inner core of one or more alloying metals coated with an outer shell of palladium.

17. A method according to claim 1, further comprising bonding said metal-coated palladium or palladium alloy particles to a support.

18. A method according to claim 17, wherein the support is electrically conductive.

19. A method according to claim 18, wherein the support is carbon black, graphitized carbon, graphite, or activated carbon.

20. A method according to claim 1 further comprising metal-bonding ligands or surfactants on the surface of said metal-coated palladium or palladium-alloy particles.

21. A method according to claim 1, wherein said hydrogen-absorbed palladium or palladium-alloy particles are formed by exposing palladium or palladium-alloy substrate particles to hydrogen.

22. A method according to claim 21, wherein said palladium or palladium-alloy substrate particles are not in contact with the metal salt or metal salt mixture when the palladium or palladium-alloy substrate particles are exposed to hydrogen.

23. A method according to claim 21, wherein the palladium or palladium-alloy substrate particles are in contact with the metal salt or metal salt mixture when the palladium or palladium-alloy substrate particles are exposed to hydrogen.

24. A method according to claim 22, further comprising additional exposure to hydrogen after the metal salt or metal salt mixture contacts the hydrogen-absorbed palladium or palladium-alloy particles.

25. A method according to claim 21, wherein the palladium or palladium-alloy particles are exposed to hydrogen for a period of time sufficient to bring x in $PdH_x$ to a value of approximately 0.6.

26. A method for producing metal-coated palladium or palladium-alloy particles, the method comprising contacting hydrogen-absorbed palladium or palladium-alloy particles with a metal salt or metal salt mixture to deposit a sub-monoatomic or monoatomic metal coating or sub-monoatomic or monoatomic metal alloy coating on the surface of said hydrogen-absorbed palladium or palladium-alloy particles, thereby producing metal-coated or metal alloy-coated palladium or palladium-alloy particles, wherein the method does not require copper electrodeposition and does not generate copper waste.

27. A method for producing electrical energy, the method comprising:
(i) contacting an oxygen-reducing cathode of a fuel cell with oxygen, wherein the oxygen-reducing cathode is comprised of platinum-coated or platinum alloy-coated palladium or palladium-alloy particles bound to an electrically conductive support;
wherein said platinum-coated or platinum alloy-coated palladium or palladium-alloy particles are produced by a method comprising:
contacting hydrogen-absorbed palladium or palladium-alloy particles with a platinum salt, or a mixture of a platinum salt and one or more non-platinum metal salts, to deposit a sub-monoatomic or monoatomic platinum coating or sub-monoatomic or monoatomic platinum alloy coating on the surface of said palladium or palladium-alloy particles, thereby producing platinum-coated or platinum alloy-coated palladium or palladium-alloy particles; and p1 (ii) contacting an anode of said fuel cell with a fuel source; wherein said oxygen-reducing cathode is in electrical contact with said anode; and said oxygen-reducing cathode and said anode are in chemical contact through mutual contact with a proton-conducting medium.

28. A method according to claim 27, wherein said platinum-coated or platinum alloy-coated palladium or palladium-alloy particles are platinum-coated or platinum alloy-coated palladium or palladium-alloy nanoparticles.

29. A method according to claim 28, wherein said platinum-coated or platinum alloy-coated palladium or palladium-alloy nanoparticles have a size of from about 5 nanometers to about 10 nanometers.

30. A method according to claim 29, wherein the fuel source is hydrogen.

31. A method according to claim 29, wherein the fuel source is an alcohol.

32. A method according to claim 31, wherein the alcohol is methanol.

33. A method according to claim 29, wherein the fuel source is gasoline reformate.

* * * * *